United States Patent
Kamimura

(10) Patent No.: US 7,373,840 B2
(45) Date of Patent: May 20, 2008

(54) ULTRASONIC FLOWMETER HAVING A TRANSMITTING BODY FIXED ON THE OUTER PERIPHERAL SURFACE OF THE PIPE

(75) Inventor: Shinobu Kamimura, Nobeoka (JP)

(73) Assignee: Asahi Organic Chemicals Industry Co., Ltd., Nobeoka-Shi (JP)

( * ) Notice: Subject to any disclaimer, the term of this patent is extended or adjusted under 35 U.S.C. 154(b) by 35 days.

(21) Appl. No.: 10/584,245

(22) PCT Filed: Dec. 22, 2004

(86) PCT No.: PCT/JP2004/019707

§ 371 (c)(1),
(2), (4) Date: Jun. 23, 2006

(87) PCT Pub. No.: WO2005/061997

PCT Pub. Date: Jul. 7, 2005

(65) Prior Publication Data

US 2007/0151361 A1   Jul. 5, 2007

(30) Foreign Application Priority Data

Dec. 24, 2003   (JP)   ............... 2003-427621

(51) Int. Cl.
*G01F 1/66* (2006.01)
(52) U.S. Cl. .................................. 73/861.27
(58) Field of Classification Search . 73/861.25–861.31
See application file for complete search history.

(56) References Cited

U.S. PATENT DOCUMENTS

| | | | | |
|---|---|---|---|---|
| 5,052,230 A * | 10/1991 | Lang et al. | ............... | 73/861.28 |
| 5,594,181 A * | 1/1997 | Stange | ..................... | 73/861.28 |
| 5,974,897 A * | 11/1999 | Koyano et al. | .......... | 73/861.29 |
| 6,055,868 A * | 5/2000 | Koyano et al. | .......... | 73/861.28 |
| 6,490,933 B2 * | 12/2002 | Koyano et al. | .......... | 73/861.27 |
| 6,532,827 B1 | 3/2003 | Ohnishi | | |
| 6,644,130 B2 * | 11/2003 | Imai et al. | ................ | 73/861.27 |
| 6,668,664 B1 * | 12/2003 | Ohkawa | .................. | 73/861.27 |
| 6,681,642 B2 * | 1/2004 | Ohkawa | .................. | 73/861.27 |
| 6,978,683 B2 * | 12/2005 | Imai et al. | ................ | 73/861.27 |
| 7,024,944 B2 * | 4/2006 | Imai et al. | ................ | 73/861.27 |

(Continued)

FOREIGN PATENT DOCUMENTS

EP   0 457 999 A1   11/1991

(Continued)

*Primary Examiner*—Harshad Patel
(74) *Attorney, Agent, or Firm*—Buchanan Ingersoll & Rooney, P.C.

(57) ABSTRACT

An ultrasonic flowmeter includes two ultrasonic transceivers (10, 16). Each of the ultrasonic transceiver (10, 16) includes a transmitting body (1; 12) fixed to the outer peripheral surface of a measurement pipe (6) through which a fluid to be measured flows so as to surround the measurement pipe (6), and an ultrasonic transducer (2; 13) spaced from the outer peripheral surface of the measurement pipe (6). The transmitting body (1) has axial end surfaces (8a, 8b) perpendicular to the axis of the measurement pipe (6). An axial end surface (7) of the ultrasonic transducer (2) is fixedly secured to the axial end surface (8b) of the transmitting body (1), and the ultrasonic transducer (2) is extended and contracted in the axial direction by applying a voltage between the axial end surfaces (8a, 8b) of the ultrasonic transducer (2).

5 Claims, 4 Drawing Sheets

U.S. PATENT DOCUMENTS

2002/0100335 A1    8/2002  Koyano et al.
2006/0243065 A1*  11/2006  Sakai et al. ............... 73/861.26
2007/0034016 A1*   2/2007  Maginnis et al. ........ 73/861.28
2007/0151361 A1*   7/2007  Kamimura ............... 73/861.27

FOREIGN PATENT DOCUMENTS

| | | |
|---|---|---|
| JP | 2653391 | 5/1997 |
| JP | 2000-146645 | 5/2000 |
| JP | 2002-221440 | 8/2002 |
| JP | 2002-303541 A | 10/2002 |
| JP | 2003-3014514 A | 1/2003 |

* cited by examiner

ULTRASONIC FLOWMETER HAVING A TRANSMITTING BODY FIXED ON THE OUTER PERIPHERAL SURFACE OF THE PIPE

TECHNICAL FIELD

The present invention relates to an ultrasonic flowmeter, for use in fluid transportation in various industries including the chemical field, the semiconductor manufacture field, the food processing field and the biotechnology field, which propagates an ultrasonic vibration through a fluid and measures the flow velocity and flow rate of the fluid from the difference between the ultrasonic wave propagation time from the upstream side and the ultrasonic wave propagation time from the downstream side of the fluid flow. In particular, the present invention relates to an ultrasonic flowmeter suitable for measuring a micro flow rate and the flow rate of a slurry fluid or especially the CMP slurry fluid used in the semiconductor field.

BACKGROUND ART

The conventional ultrasonic flowmeters for measuring a flow rate of a fluid from the difference in ultrasonic wave propagation time are generally classified into three types.

FIG. 9 shows a structure of an ultrasonic flowmeter according to a first prior art. In FIG. 9, reference numeral "100" designates a substantially U-shaped flow passage-forming body through which a fluid flows as indicated by solid arrows. Reference numerals "101" and "102" designate ultrasonic transducers, which are arranged on both sides of a linear pipe portion 103 of the flow passage-forming body 100. In this ultrasonic flowmeter, when the ultrasonic transducer 101 on the upstream side is excited by an electrical signal from a converter (not shown) while the flow passage-forming body 100 is filled with the fluid flowing therein, an ultrasonic wave is generated and propagated through the fluid in the straight pipe portion 103 of the flow passage-forming body 100. The ultrasonic wave is received by the ultrasonic transducer 102 on the downstream side and converted into an electrical signal, which is output to the converter. After that, the ultrasonic transducer 102 on the downstream side is instantaneously excited by the electrical signal from the converter. The ultrasonic wave thus generated is propagated through the fluid in the straight pipe portion 103, received by the ultrasonic transducer 101 on upstream side, and converted into an electrical signal, which is output to the converter. In the process, the difference of the ultrasonic wave propagation time is used to determine the velocity of the fluid in the flow passage-forming body 100 and to measure the flow rate (as disclosed, for example, in Japanese Unexamined Patent Publication No. 2000-146645).

FIG. 10 shows a structure of an ultrasonic flowmeter according to a second prior art. In FIG. 10, reference numeral "110" designates a measurement pipe in which a fluid flows as indicated by solid arrows. Reference numerals "111" and "112" designate detectors which are, in pairs, clamped at positions opposed to each other in different annular lines on the outer peripheral surface of the measurement pipe 6. In this ultrasonic flowmeter, the ultrasonic vibration generated from the detector 111 is propagated diagonally with respect to a direction of flow of the fluid in the measurement pipe (in a direction indicated by dashed arrows in FIG. 10) and received by the detector 112. In this case, as in the first prior art, the ultrasonic flowmeter is one in which the transmitting and receiving of the detectors 111, 112 are switched to measure the flow rate from the difference in the propagation time of the ultrasonic vibrations. The structure of the detectors 111, 112 in FIG. 10 is shown diagrammatically in FIG. 10 and, in actual installation as described in Japanese Unexamined Patent Publication No. 2003-75219, the ultrasonic transducer is mounted on an inclined surface of a wedge-shaped fixing device so that the ultrasonic wave from the ultrasonic transducer may be propagated diagonally with respect to the center axis of the pipe.

FIG. 11 shows a third prior art. As shown in FIG. 11, two detectors 114, 115 are clamped in alignment, and in spaced relation to each other, on the outer peripheral surface of a measurement pipe 113. In this measurement pipe 113, the ultrasonic vibration, generated by the detector 114 having an ultrasonic transducer similar to that of the second prior art, is reflected in the direction of dashed arrows of FIG. 11 on the inner surface of the measurement pipe 113, so that the flow rate is measured from the difference in the propagation time of the ultrasonic vibration between the case in which the reflected ultrasonic vibration is received by the detector 115 and the case in which the ultrasonic vibration generated from the detector 115 is reflected on the inner surface of the measurement pipe 113 and received by the detector 114.

However, the ultrasonic flowmeter according to the first prior art has a substantially U-shaped flow passage-forming body 100. This causes a problem that, in the case where the fluid flowing in the flow passage-forming body 100 is a slurry, the slurry tends to be deposited and fixed on the curved portions 104 of the flow passage-forming body 100 and the propagation of the ultrasonic vibration is hampered thereby making accurate flow rate measurement impossible especially in a CMP (chemical mechanical polishing) device in the semiconductor field. Also, a problem is posed that the curved portions 104 of the flow passage-forming body 110 cause a pressure loss of the fluid in the flow passage-forming body 110, thereby making it impossible to accurately measure the velocity and hence the flow rate. Further, a problem is posed that the substantially U-shaped pipe path results in a high production cost.

In the ultrasonic flowmeter according to the second prior art, while the slurry is not deposited, a smaller bore of the measurement pipe is required to obtain a measurable velocity in the measurement of a micro flow rate. This correspondingly reduces the mounting distance between the detectors 111 and 112, thereby resulting in a problem that the resulting smaller propagation distance and propagation time difference make an accurate measurement, or any measurement, impossible. Further, the fixing devices 111 and 112 are used for efficient propagation of the ultrasonic vibration diagonally with respect to the axial direction of the pipe, and the intervention of a material, such as epoxy resin, lower in propagation rate than the measurement pipe is required to reduce the reflection from the measurement pipe as a method of improving the measurement sensitivity. However, the use of the resin alone has a disadvantage of an increased attenuation of the ultrasonic vibration.

In addition, the third prior art has problems that the reflection increases the attenuation of the ultrasonic vibration and thereby makes it difficult to measure a micro flow rate and that the mounting of the detectors 114 and 115 is difficult.

DISCLOSURE OF THE INVENTION

The object of the present invention is to obviate the above-mentioned problems of the prior arts and to provide a compact and inexpensive ultrasonic flowmeter in which the ultrasonic vibration is efficiently propagated through the fluid in a small-bore pipe and the flow rate can be measured with high accuracy.

In order to achieve the above object, according to the present invention, there is provided an ultrasonic flowmeter including two ultrasonic transceivers mounted in spaced relation to each other in an axial direction on the outer peripheral surface of a pipe through which a fluid flows, the ultrasonic flowmeter determining a flow velocity of the fluid by receiving an ultrasonic vibration transmitted from one of the two ultrasonic transceivers through the fluid in the pipe with the other ultrasonic transceiver, alternately switching between the ultrasonic transceiver at the transmitting end and the ultrasonic transceiver at the receiving end, and measuring the ultrasonic wave propagation time between the two ultrasonic transceivers, wherein each of the ultrasonic transceivers includes a cylindrical transmitting body fixed to the outer peripheral surface of the pipe so as to surround the pipe and an ultrasonic transducer spaced apart from the outer peripheral surface of the pipe, the transmitting body having axial end surfaces perpendicular to the axis of the pipe, the ultrasonic transducer having axial end surfaces each fixedly secured to the axial end surfaces of the transmitting body, the ultrasonic transducer adapted to be expanded and contracted in axial direction by applying a voltage between the axial end surfaces of the ultrasonic transducer.

The ultrasonic transducer generally generates the largest vibration energy in a direction in which a voltage is applied thereto. In the ultrasonic flowmeter according to the present invention, the axial end surface of the ultrasonic transducer is fixedly secured to the axial end surface of the transmitting body and the ultrasonic transducer is expanded and contracted in an axial direction thereof. Therefore the ultrasonic vibration generated by the ultrasonic transducer can be propagated efficiently to the fluid through the transmitting body. Also, as the axial end surface of the ultrasonic transducer is fixedly secured to the axial end surface of the cylindrical transmitting body, a large ultrasonic vibration transmitting area can be secured between the ultrasonic transducer and the transmitting body, so that a large amount of ultrasonic vibration energy can be transmitted from the ultrasonic transducer to the transmitting body. Further, as the transmitting body is arranged so as to surround the outer periphery of the pipe, the ultrasonic vibration can be propagated to the fluid in the pipe from the whole periphery of the pipe so that a larger amount of ultrasonic vibration energy can be transmitted to the fluid in the pipe. Thus, the ultrasonic flowmeter according to the present invention makes a highly sensitive measurement possible and it can be reduced in size.

Also, as the ultrasonic transducer is spaced apart from the outer peripheral surface of the pipe, the ultrasonic vibration is not transmitted directly to the pipe. Therefore, the vibration transmitting through the pipe, i.e. external disturbances against the measurement, can be reduced. As a result, the measurement sensitivity of the ultrasonic flowmeter according to the present invention is further improved.

The ultrasonic transducer preferably has a shape of a disk with a hole.

The transmitting body preferably has a substantially conical shape having an outer diameter progressively decreasing from one axial end surface with the ultrasonic transducer fixedly secured thereto toward the other axial end surface.

Also, as a metal material hardly attenuates the ultrasonic vibration, the transmitting body is preferably made of a metal material.

Further, the ultrasonic transducer and the propagation unit may be divided into a plurality of parts in the direction along the outer peripheral surface of the pipe.

Also, the transmitting body may be integrated with the pipe.

The present invention has the configuration described above, and the superior effects described below can be obtained by using the present invention.

(1) The ultrasonic transceiver is configured of a cylindrical transmitting body and an ultrasonic transducer and the axial end surface of the ultrasonic transducer and the axial end surface of the transmitting body are fixedly secured to each other so that the ultrasonic vibration in the direction along the thickness of the ultrasonic transducer (in the direction parallel to the axis of the pipe) can be propagated to the fluid in the measurement pipe. Therefore, the ultrasonic vibration energy generated by the ultrasonic transducer can be efficiently transmitted to the fluid in the measurement pipe. As a result, the ultrasonic flowmeter according to the present invention can make a highly accurate measurement of a micro flow rate even with a measurement pipe having a small bore.

(2) As each ultrasonic transducer is spaced apart from the outer peripheral surface of the measurement pipe, the ultrasonic vibration cannot be directly transmitted to the measurement pipe from the ultrasonic transducer. Therefore, the ultrasonic vibration transmitted to the pipe wall from the ultrasonic transducer, and other outer disturbances, which appear as noise at the time of measurement, can be reduced, thereby making a highly accurate flow rate measurement possible.

(3) As the ultrasonic transducer and the transmitting body are arranged so as surround the measurement pipe, the ultrasonic vibration is propagated from the whole periphery of the pipe to the fluid in the pipe. Therefore, the ultrasonic flowmeter according to the present invention can apply a large amount of vibration energy to the fluid, thereby making a highly sensitive measurement possible.

(4) As a result of the aforementioned effects, a still more compact and inexpensive ultrasonic flowmeter can be provided.

(5) Further, as the ultrasonic transceiver can be installed on a straight pipe, the pressure loss is small and even a fluid such as slurry does not stagnate. Therefore, measurement of the flow rate of a CMP slurry fluid, used in the semiconductor field, is made possible.

BRIEF DESCRIPTION OF THE DRAWINGS

The above and other objects, features, and advantages of the present invention will be described below in more detail based on the embodiments of the present invention with reference to the accompanying drawings, wherein.

BEST MODE FOR CARRYING OUT THE INVENTION

While embodiments of the present invention will be described below with reference to FIGS. 1 to 8, the present invention should not, of course, be limited to thereto.

Figure 1:
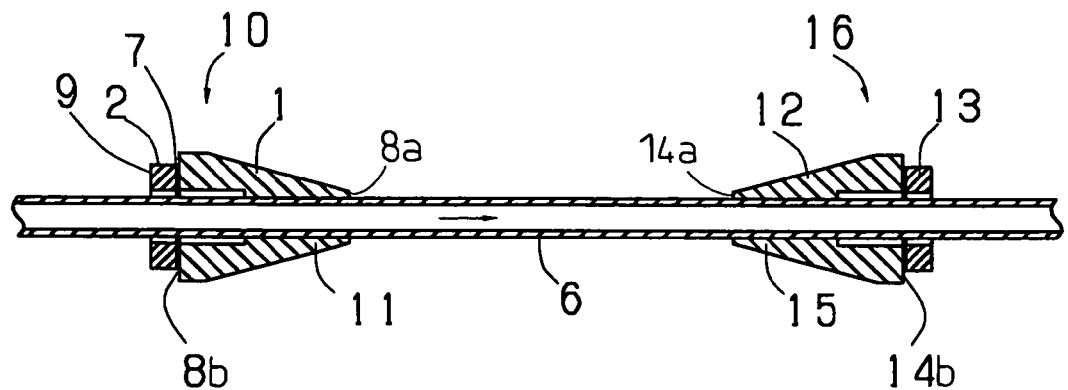
FIG. 1 is a longitudinal sectional view showing a first embodiment of the present invention.
Figure 2:
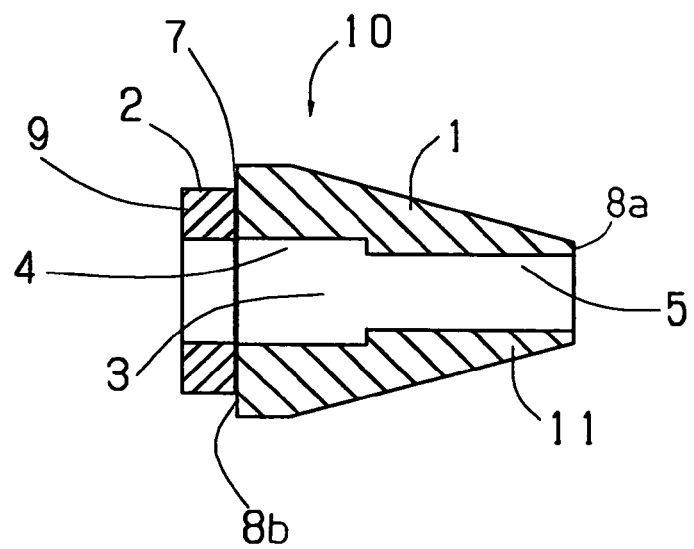
FIG. 2 is a longitudinal sectional view showing the ultrasonic transceiver of the present invention of FIG. 1.
Figure 3:
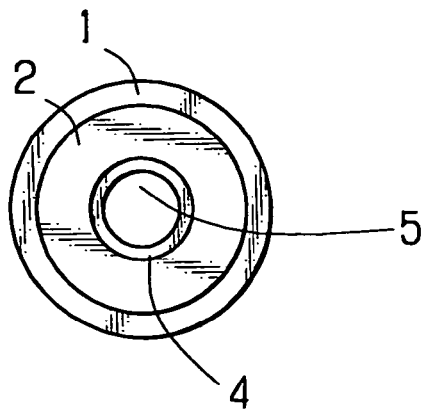
FIG. 3 is a left side view showing the ultrasonic transceiver of the present invention of FIG. 1.
Figure 4:
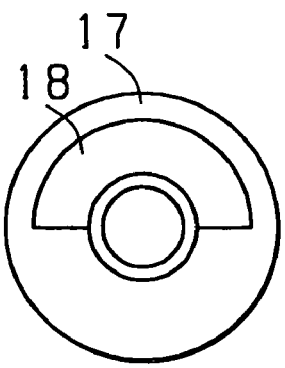
FIG. 4 is a left side view showing of an ultrasonic transducer of the present invention having a semicircular shape.

First, a first embodiment of the present invention will be described with reference to FIGS. 1 to 3. Reference numeral "1" designates a transmitting body made of duralumin. The transmitting body 1 has a substantially conical shape and is arranged to surround a measurement pipe 6 made of fluorinated resin. The transmitting body 1 has two axial end surfaces 8a, 8b extending in a direction perpendicular to the axis of the measurement pipe 6. Also, a through-hole 3 including a front through-hole 5 and a rear through-hole 4 is formed at the center of the transmitting body 1. The rear through-hole 4 has an increased diameter larger than that of the front through-hole 5, so that, when the inner peripheral surface of the front through-hole 5 is closely fixed by an adhesive of epoxy resin on the outer peripheral surface of the measurement pipe 6 of fluorinated resin, the inner peripheral surface of the rear through-hole 4 is spaced from the measurement pipe 6. Although duralumin is used as a material for the transmitting body 1 in this embodiment, the material for the transmitting body 1 may be a metal such as aluminum, aluminum alloy, titanium, hastelloy or SUS, resin, glass, quartz or any other material which can propagate ultrasonic vibration and, preferably, may be a metal having a good ultrasonic wave propagation characteristic. Also, although the transmitting body 1 has the substantially conical shape, it may have any other shape capable of efficiently propagating the ultrasonic vibration and the shape of the transmitting body 1 is not limited to a substantially conical shape. Further, although the adhesive of epoxy resin is used in this embodiment for the close fixing, a grease or adhesive of any other bonding agents may be used or the close fixing may be achieved simply by pressure insertion. In other words, the transmitting body 1 may be arranged on the measurement pipe 6 so as to prevent the ultrasonic vibration from being transmitted from an ultrasonic transducer 2 described later to the measurement pipe 6.

Reference numeral "2" designates an ultrasonic transducer using a piezoelectric material such as lead zirconate titanate (PZT). The ultrasonic transducer 2 has a doughnut shape or a shape of a disk with a hole. The axial end surface 7 of the ultrasonic transducer 2 is bonded under pressure by epoxy resin over the whole of one axial end surface 8b of the transmitting body 1, and a vibration insulator (not shown) is applied or closely fixed by adhesion to the other axial end surface 9 and the outer peripheral surface of the ultrasonic transducer 2. The inner diameter of the ultrasonic transducer 2 is substantially equal to the diameter of the rear through-hole 4 of the transmitting body 1, and the inner peripheral surface thereof is spaced from the outer peripheral surface of the measurement pipe 6. Also, the axial end surface 7 electrically functions as an earth terminal. The ultrasonic transducer 2 is closely fixed to the transmitting body 1 in this way to form an upstream ultrasonic transceiver 10. Although the ultrasonic transducer 2 in this embodiment has a shape of a disk with a hole, it may alternatively have a semicircular (FIG. 4) or sector shape. Also, although the inner peripheral surface of the ultrasonic transducer 2 is spaced from the outer peripheral surface of the measurement pipe 6, it may be closely fixed to the measurement pipe 6 with a material for cutting off the ultrasonic vibration (a vibration insulator) interposed between them.

The downstream ultrasonic transceiver 16 also has a configuration similar to that of the upstream ultrasonic transceiver 10. The two ultrasonic transceivers 10 and 16 are axially spaced from each other on the outer periphery of the measurement pipe 6 with the transmitting bodies 1 and 12 facing each other.

Next, the operation of the ultrasonic flowmeter according to the first embodiment of the present invention will be described with reference to FIG. 1. A fluid to be measured flows through the inside of the measurement pipe 6 in a filled state in a direction indicated by solid arrow of FIG. 1. As the measurement pipe 6 is of straight type, no pressure loss is caused and the possibility of slurry stagnating can be reduced. When a voltage pulse or a voltage having no frequency component is applied from a converter (not shown) to the ultrasonic transducer 2 of the ultrasonic transceiver 10 located on the upstream side along the fluid flow direction, the ultrasonic transducer 2 generates a vibration in a direction along the thickness (i.e. in a direction of voltage application) and in a diametrical direction (i.e. in a direction perpendicular to the direction of the voltage application). In the ultrasonic transceiver 10, the axial end surface 7 of the ultrasonic transducer 2 is fixedly secured to the axial end surface 8b of the transmitting body 1 and a voltage is applied between the axial end surfaces 7 and 9 of the ultrasonic transducer 2, so that the ultrasonic vibration in the direction along the thickness, which has a large energy of ultrasonic vibration, is propagated to the axial end surface 7 of the transmitting body 1. On the other hand, as the ultrasonic vibration along the diametrical direction of the ultrasonic transducer 2 is absorbed by the vibration insulator to remove the reverberation of the ultrasonic wave, it cannot be propagated to the surroundings.

The ultrasonic vibration thus propagated to the transmitting body 1 is further propagated toward the front portion 11 through the transmitting body 1. It is presumed that the ultrasonic vibration propagated to the front portion 11 and having the enhanced directivity thereof toward the center of the measurement pipe 6 is transmitted from the whole outer periphery of the pipe through the pipe wall to the fluid in the measurement pipe 6 and is then propagated in the fluid while spreading like a fan in a direction substantially parallel to the axis of the pipe. Then, from the front portion 15 of the transmitting body 12 of the downstream ultrasonic transceiver 16 located in an opposed relation, the ultrasonic vibration is propagated through the inside of the transmitting body 12 and through the axial end surface 14b (the end surface far from the axial end surface 14a on the side of the transmitting body 11) to the transducer 13 and is converted into an electrical signal, which is output to the converter.

In the transmitting body 1, the substantially conical shape thereof enhances the directivity of the ultrasonic vibration toward the inside of the measurement pipe, and the use of a metal having a good ultrasonic wave propagation characteristic suppresses the attenuation of the amplitude of the ultrasonic vibration. Also, as the ultrasonic transducer 2 is not in contact with, but is spaced from, the measurement pipe 6, the ultrasonic vibration transmitted through the pipe wall and resulting in noise, and other external disturbances, can be reduced, thereby making a highly accurate flow rate measurement possible. Further, as the axial end surface 7 of the ultrasonic transducer 2 electrically functions as an earth, a highly accurate flow rate measurement with a reduced noise is made possible.

When the ultrasonic vibration is transmitted from the upstream ultrasonic transceiver 10 to the downstream ultrasonic transceiver 16 and received, the transmission and receipt are instantaneously switched in the converter, and a voltage pulse or a voltage having no frequency component is applied from the converter to the ultrasonic transducer 13 of the downstream ultrasonic transceiver 16. Then, the ultrasonic vibration, as in the upstream ultrasonic transceiver 10, is generated and propagated through the transmitting body 12 to the fluid in the measurement pipe 6. This ultrasonic vibration is again propagated from the front portion 11 of the transmitting body 1 of the upstream ultrasonic transceiver 10 located in opposed relation through the transmitting body 1 and through the axial end surface 8 to the ultrasonic transducer 2 and is converted into an electrical signal, which is output to the converter. In the process, the ultrasonic vibration is propagated against the flow of the fluid in the measurement pipe 6. Therefore, the propagation speed of the ultrasonic vibration in the fluid is lower than when a voltage pulse or a voltage having no frequency component is applied to the upstream ultrasonic transceiver 10, and the propagation time is longer.

In the converter, from the electrical signals thus output, the propagation time of the ultrasonic vibration from the upstream ultrasonic transceiver 10 to the downstream ultrasonic transceiver 16 and the propagation time of the ultrasonic vibration from the downstream ultrasonic transceiver 16 to the upstream ultrasonic transceiver 10 are measured and the difference between them is determined. Based on the difference, the fluid velocity and flow rate are calculated, so that the flow rate can be measured with a high accuracy.

Next, a second embodiment of the present invention will be described with reference to FIGS. 5 and 6.

Figure 5:
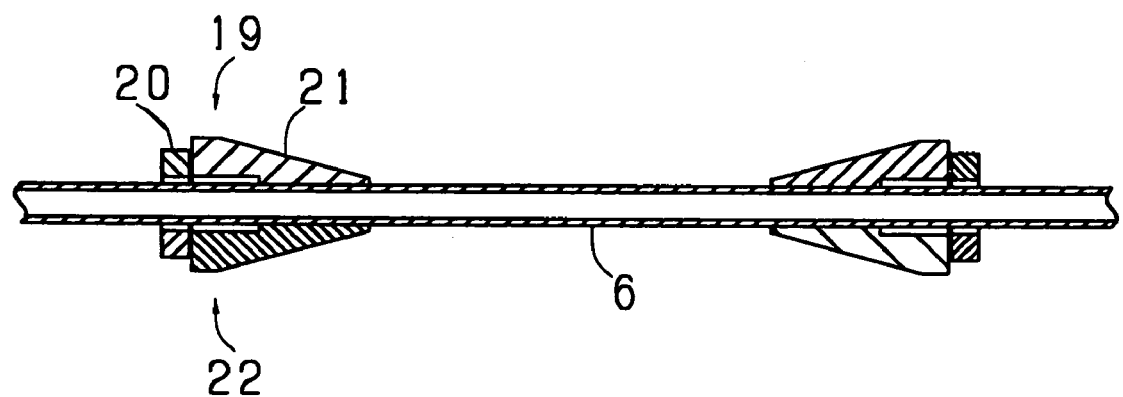
FIG. 5 is a longitudinal sectional view showing a second embodiment of the present invention.
Figure 6:
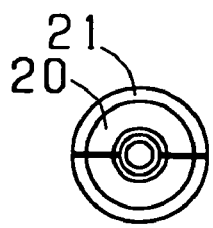
FIG. 6 is a left side view of the present invention of FIG. 5.

FIGS. 5 and 6 show an embodiment in which the ultrasonic transceiver is divided into upper and lower parts. Reference numeral "19" designates an upper half part of the two-part-type ultrasonic transceiver located on the upstream side. The ultrasonic transducer 20 having a substantially semicircular cross section is closely fixed to the substantially semicircular bottom surface of the transmitting body 21, like in the first embodiment, and a pair of half parts, i.e. the ultrasonic transceiver upper half part 19 and the ultrasonic transceiver lower half part 22 having a similar structure, forms an ultrasonic transceiver. It should be noted that only the ultrasonic transceiver upper half part 19 can perform the required functions. In this embodiment, like in the first embodiment, only the inner peripheral surface of the front portion of the through-hole of the transmitting body 21 is in close contact with the measurement pipe 6, while the inner peripheral surface of the other portion of the through-hole is spaced from the outer peripheral surface of the measurement pipe 6. The operation of this embodiment is also similar to that of the first embodiment. The ultrasonic transceiver can be made smaller and lighter. Further, as pressure can be efficiently applied to the epoxy resin in the closely fixing process to perform an adhesion, the adhesive force is increased. Therefore, the transmission and the receipt of the ultrasonic vibration with a higher accuracy is made possible, thereby resulting in a highly accurate measurement of the flow velocity and the flow rate.

Figure 7:
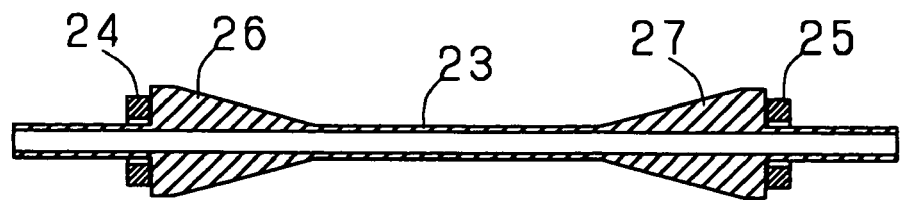
FIG. 7 is a longitudinal sectional view showing a third embodiment of the present invention.

Next, a third embodiment of the present invention will be described with reference to FIG. 7.

Reference numeral "23" designates an integrated transmitting body-measurement pipe in which the measurement pipe is integrated with the transmitting body. The ultrasonic transducers 24 and 25 are closely fixed, by a way similar to the first embodiment, to the axial end surfaces of the transmitting body parts 26 and 27 of the integrated transmitting body-measurement pipe 23, and an ultrasonic transceiver is configured of the ultrasonic transducers 24, 25 and the transmitting body parts 26, 27 form ultrasonic transceivers, respectively. At the time of installation, the transmitting bodies, as in the first embodiment, are not required to be closely fixed to the measurement pipe, and the ultrasonic transducers 24 and 25 are closely fixed simply to the axial end surfaces of the transmitting body parts 26 and 27. Therefore, installation can be simplified.

Figure 8:
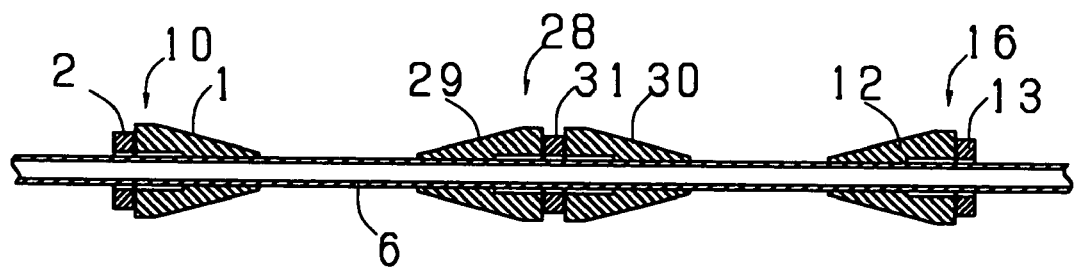
FIG. 8 is a longitudinal sectional view showing a fourth embodiment of the present invention.
Figure 9:
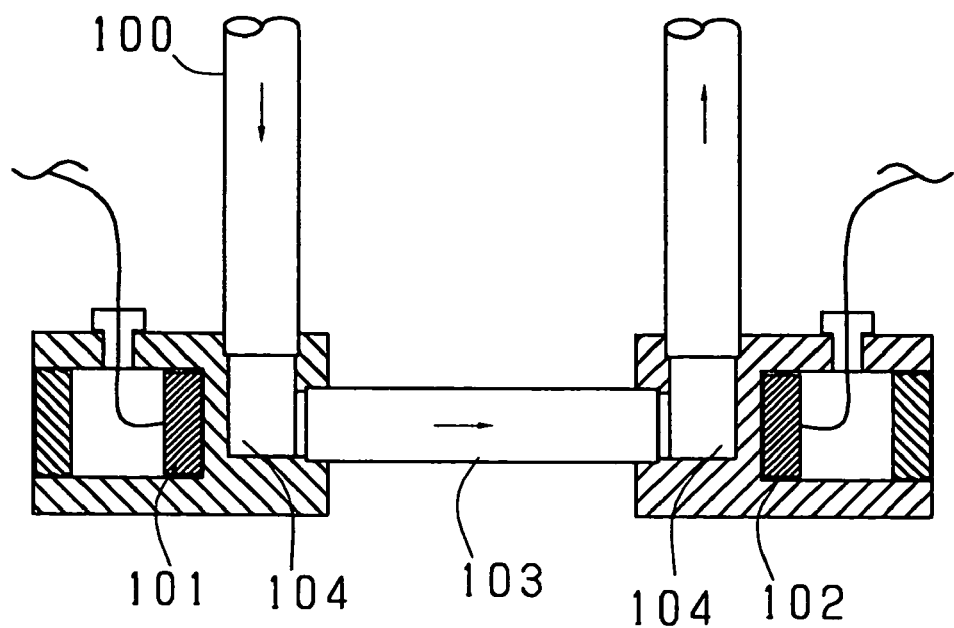
FIG. 9 is a longitudinal sectional view showing an ultrasonic flowmeter according to the first prior art.
Figure 10:
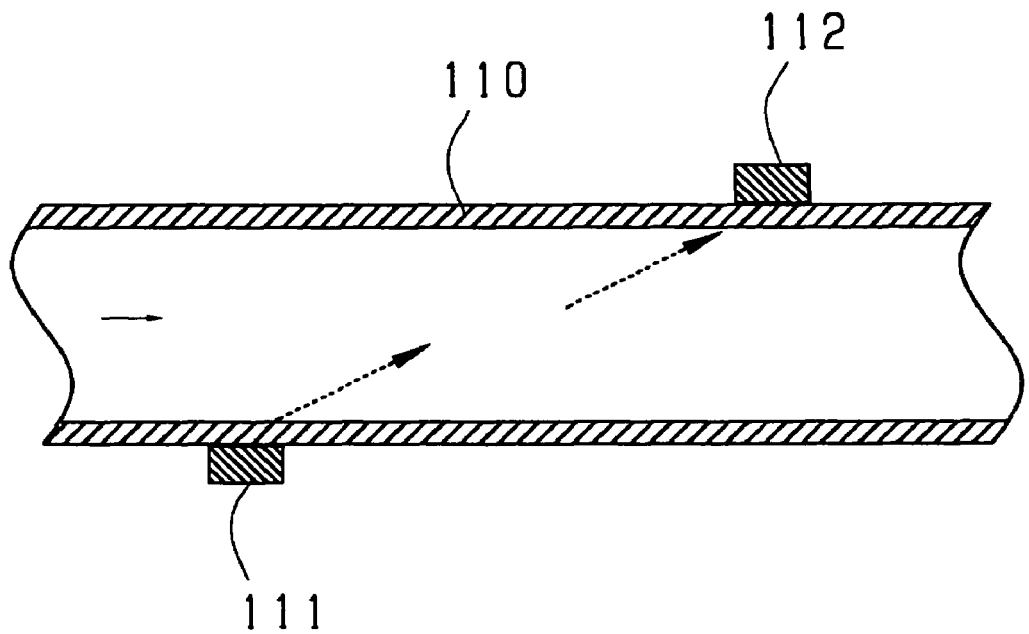
FIG. 10 is a longitudinal sectional view showing an ultrasonic flowmeter according to the second prior art.
Figure 11:
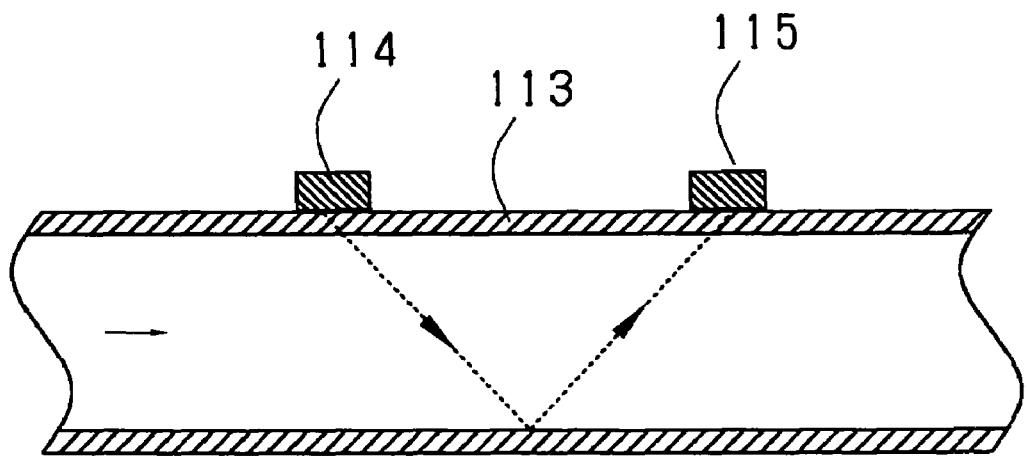
FIG. 11 is a longitudinal sectional view showing an ultrasonic flowmeter according to the third prior art.

Next, a fourth embodiment of the present invention will be described with reference to FIG. 8.

Reference numeral "28" designates an ultrasonic transceiver, in which an ultrasonic transducer 31 is held between transmitting bodies 29, 30, and the axial end surfaces of the transmitting bodies 29, 30s are closely fixed to the axial end surfaces of the ultrasonic transducer 31 by a way similar to the first embodiment. Only the front portions of the transmitting bodies 29, 30 are closely fixed to the measurement pipe 6. Further, the ultrasonic transceiver 28 is spaced from and arranged between the ultrasonic transceivers 10 and 16 of the first embodiment, with the transmitting bodies 29, 30 facing the ultrasonic transceivers 10, 16, and functions only as a transmitter. The operation of this embodiment will be described below. When a voltage pulse or a voltage having no frequency component is applied to the ultrasonic transceiver 28, the ultrasonic vibration is propagated from the front portions of the propagation units 29, 30 through the measurement pipe 6, and received by the ultrasonic transceivers 10, 16 operating as upstream and downstream receivers, respectively. Then, the velocity and the flow rate are measured based on the difference of the propagation time of the ultrasonic vibration from the upstream side and the propagation time of the ultrasonic vibration from the downstream side. In this embodiment, the ultrasonic vibration toward the upstream side and the ultrasonic vibration toward the downstream side are generated concurrently, and therefore the velocity and the flow rate can be measured with a higher accuracy and a quicker response.

The use of the present invention described above makes it possible to propagate the ultrasonic vibration efficiently to the fluid in the measurement pipe, and the measurement with a high accuracy is made possible. Especially, a highly accurate measurement of a micro flow rate is made possible and, further, installation in a smaller space is made possible in the semiconductor field or the like.

Although the several embodiments of the present invention shown in the accompanying drawings have been described above, these embodiments are only illustrative and are not limitative. Therefore, the scope of the present invention is defined by the appended claims and the embodiments of the present invention can be modified or changed without departing from the scope of the claims.

The invention claimed is:

1. An ultrasonic flowmeter comprising two ultrasonic transceivers mounted in spaced relation to each other in an axial direction on the outer peripheral surface of a pipe through which a fluid flows, said ultrasonic flowmeter determining a flow velocity of said fluid by receiving an ultrasonic vibration transmitted from one of said two ultrasonic transceivers through the fluid in said pipe with the other ultrasonic transceiver, alternately switching between the ultrasonic transceiver at the transmitting end and the ultrasonic transceiver at the receiving end, and measuring the ultrasonic wave propagation time between the two ultrasonic transceivers, wherein each of the ultrasonic transceivers comprises a cylindrical transmitting body fixed to the outer peripheral surface of said pipe so as to surround said pipe and an ultrasonic transducer spaced apart from the outer peripheral surface of said pipe, said transmitting body having a substantially conical shape having an outer diameter progressively decreasing from one axial end surface with said ultrasonic transducer fixedly secured thereto toward the other axial end surface, said transmitting body having axial end surfaces perpendicular to the axis of said pipe, said ultrasonic transducer having axial end surfaces each fixed to said axial end surfaces of said transmitting body, said ultrasonic transducer adapted to be expanded and contracted in axial direction by applying a voltage between said axial end surfaces of said ultrasonic transducer.

2. The ultrasonic flowmeter according to claim 1 wherein said transmitting body is made of a metal material.

3. The ultrasonic flowmeter according to claim 1 wherein said ultrasonic transducer and said transmitting body are divided into a plurality of parts in the peripheral direction along the outer peripheral surface of said pipe.

4. The ultrasonic flowmeter according to claim 1 wherein said transmitting body is integrated with said pipe.

5. The ultrasonic flowmeter according to claim 1 wherein said pipe is made of resin.

* * * * *

UNITED STATES PATENT AND TRADEMARK OFFICE
CERTIFICATE OF CORRECTION

| | |
|---|---|
| PATENT NO. | : 7,373,840 B2 |
| APPLICATION NO. | : 10/584245 |
| DATED | : May 20, 2008 |
| INVENTOR(S) | : Shinobu Kamimura |

It is certified that error appears in the above-identified patent and that said Letters Patent is hereby corrected as shown below:

On page 2 under the heading FOREIGN PATENT DOCUMENTS, second column, line 4,

"JP 2003-3014514 A 1/2003" should read --JP 2003-014514 A 1/2003--.

Signed and Sealed this
Tenth Day of May, 2011

David J. Kappos
*Director of the United States Patent and Trademark Office*